UNITED STATES PATENT OFFICE.

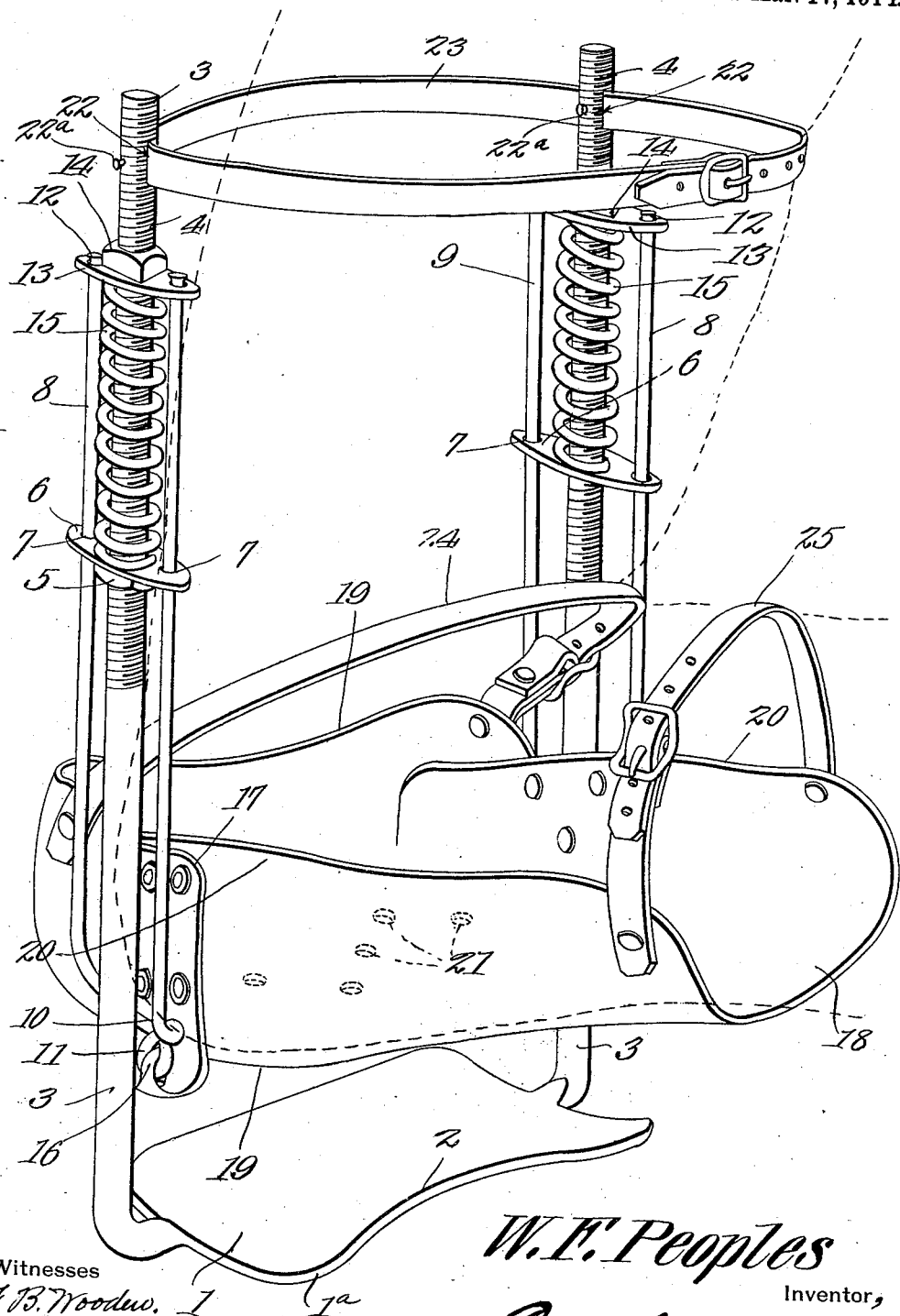

WILLIAM F. PEOPLES, OF ABILENE, TEXAS.

KNEE-REST.

1,090,408. Specification of Letters Patent. Patented Mar. 17, 1914.

Application filed September 25, 1913. Serial No. 791,832.

*To all whom it may concern:*

Be it known that I, WILLIAM F. PEOPLES, a citizen of the United States, residing at Abilene, in the county of Taylor and State of Texas, have invented a new and useful Knee-Rest, of which the following is a specification.

This invention relates to a knee rest particularly designed for use by cotton pickers and others whose occupations require that they assume a kneeling posture.

Heretofore considerable annoyance from briars, burs and stones, as well as from the hot ground, has been occasioned and, in order to overcome the disadvantages heretofore present, the device herein disclosed has been devised.

One of the objects of the present invention is to provide a knee engaging cap or socket yieldingly supported by a ground engaging member, said member and socket having means for connecting them securely to the leg of the user so that, when the ground engaging portion is placed on the ground, the knee engaging portion will act as a cushion to support the knee comfortably and where it will be protected from briars, stones and the like.

A further object is to provide a device of this character which can be worn comfortably while the user is in either a kneeling or a standing position and which utilizes cushioning springs the tension of which can be regulated as desired.

Another object is to provide a knee rest which can be easily placed in or removed from position on the leg of the user.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawing, which is a perspective view of the knee rest, the preferred form of the invention has been shown.

Referring to the drawing by characters of reference 1 designates a base or ground engaging plate the front and back edges of which are preferably bent upwardly either along curved or straight lines, the back edge being cut inwardly as shown at 2, so as to provide a recess for the reception of the lower portion of the leg of the user, while the user is standing. The corners of the plate 1 are rounded as shown at 1ª to prevent the plate from digging into the ground, to prevent the plate from catching on weeds, and to increase the stability of the plate when the same is tilted and rests on one corner. Extending upwardly from the sides of the base plate 1 are guide stems 3 of any desired length the upper ends of which are screw threaded as shown at 4. Stop nuts 5 are arranged on the threaded portions 4 of the stems 3 and support elongated guide plates 6 having openings 7 within which the side 8 of bails 9 are adapted to slide. The lower ends of the bails are offset inwardly, as at 10 and provided with eyes 11. The upper ends of the bails are upset or headed as shown at 12 and are fitted within a plate 13 slidably mounted on the stems 3. A nut 14 which engages stem 3 serves to limit the upward movement of plate 13. A coiled spring 15 is mounted on each stem or rod 3 and bears at its ends against the nut 5 and the plate 13, thus operating to hold the plate 13 normally pressed upwardly against the nut 14.

The eyes 11 are engaged by hooks 16 extending from plates 17 which, as shown in the drawing, are fastened by rivets to the sides of a knee rest 18 preferably formed of leather. The lower portion of the knee rest is bent back substantially at right angles to the upper portion, as shown at 19, so as thus to form a ledge for engagement by the knee. This lower portion has side wings 20 held by rivets or the like to the sides of the upper portion so that the knee engaging portion is thus kept in proper shape at all times. Ventilating openings 21 may be provided at any desired points in the knee engaging portion and also serve to allow gravel and the like to escape readily from the said portion.

Slots 22 are formed in the upper end portions of the rod 3 and receive a strap 23 held by pins 22ª or the like and adapted to be secured about the leg above the knee so as thus to hold the rods 3 against displacement relative to the leg of the user. Additional straps 24 are secured to the upper corner portions of the knee engaging portion 19 and are likewise adapted to be strapped about the leg above the knee. Other straps 25 are attached to the wings 20 and are adapted to extend about the leg of the user at points below the knee.

In using the device, the straps 23 and 24 are secured about the leg above the knee so that rods 3 will be located about the sides of the leg. Straps 25 are secured about the leg below the knee. Thus it will be seen that while the user is standing, plate 1 will be supported in front of the lower portion of the leg, the leg extending into the recess formed by the curved edge 2. When the operator assumes a kneeling posture, the knee is projected against the engaging portion 19 and the skin rests upon the lower portion 18. The weight of the user is thus applied to the bails 9 and these bails pull downwardly on plate 13 so as to compress springs 15 upon plates 6, the springs thus serving as cushions. Thus it will be seen that injury to the knee from stones, briars, or the like, or discomfort such as caused by the highly heated surface of the ground, will be prevented. The operator can kneel or rise without causing the device to become displaced relative to the knee. It will be seen that by tightening the nuts 5, the tension of the spring 15 can be varied.

The knee rest 18—19 is suspended above the eyes 11 and thus when weight is imposed on the knee rest, the tendency is to advance the knee into the angle of the knee rest.

What is claimed is:—

1. A knee rest including a flexible knee engaging portion forming a socket, bails pivotally connected to the sides of said portion, a ground engaging member, guides extending therefrom, slidable connections between the bails and guides, and cushioning springs upon the guides and coöperating with said connections for retarding the downward movement of the knee engaging portion relative to the ground engaging portion.

2. A knee rest including a ground engaging portion, guide rods extending therefrom, means for securing the upper end portions of the rods to the leg of the user, cushioning springs mounted on the rods, a knee engaging portion, means for attaching said portion to the knee of the user, means movable with the knee engaging portion for placing the springs under compression when said portion is subjected to weight, and means for varying the tension of the springs.

3. The combination with a ground engaging member and guide rods extending therefrom, of a knee engaging portion, means for securing the same to a knee, means for securing the upper ends of the rods to the leg of the user, plates mounted on the rods, a spring mounted on each rod between the plates thereon, means for adjusting the plates relative to each other, a bail slidably mounted in one plate and constituting means for shifting the other plate against the spring thereunder, and a pivotal connection between each bail and the knee engaging portion.

4. A knee rest including a flexible knee engaging portion forming a socket and having apertures, hooks connected to the sides of said portion, bails pivotally engaged by the hooks, a ground engaging member, guide rods extending therefrom, slidable connections between the bails and the rods, cushioning springs on the rods and coöperating with said connections for retarding the downward movement of the knee engaging portion relative to the ground engaging portion.

5. A knee rest including a flexible knee engaging portion forming a socket and having apertures, hooks connected to the sides of said portion, bails pivotally engaged by the hooks, a ground engaging member, guide rods extending therefrom, slidable connections between the bails and the rods, cushioning springs on the rods and coöperating with said connections for retarding the downward movement of the knee engaging portion relative to the ground engaging portion, means upon the rods for attaching them to the leg of the user, and means upon the knee engaging portion for attaching it to the knee of the user.

In testimony that I claim the foregoing as my own, I have hereto affixed my signature in the presence of two witnesses.

WILLIAM F. PEOPLES.

Witnesses:
THOMAS J. HUMPHREYS,
ZADAK D. HAILY.

Copies of this patent may be obtained for five cents each, by addressing the "Commissioner of Patents, Washington, D. C."